(12) United States Patent
Hughes et al.

(10) Patent No.: US 6,455,788 B2
(45) Date of Patent: Sep. 24, 2002

(54) BYPASS DEVICE FOR AMPLIFIER

(75) Inventors: Jeffrey P. Hughes, Lawrenceville, GA (US); Joel P. Jenkins, Lawrenceville, GA (US); William G. Mahoney, Suwanee, GA (US); Bart F. Spriester, Atlanta, GA (US); Joshua C. Yi, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/894,624

(22) Filed: Jun. 28, 2001

Related U.S. Application Data

(63) Continuation of application No. 09/332,778, filed on Jun. 14, 1999, now Pat. No. 6,294,846.

(51) Int. Cl.⁷ .................................................. H03H 7/00
(52) U.S. Cl. ................. 200/1 R; 200/16 D; 200/50.01; 200/51.1; 307/119
(58) Field of Search ................................ 200/1 R, 16 B, 200/16 D, 16 R, 50.01, 50.02, 50.1, 43.01, 43.07, 43.09, 51 R, 51.02, 51.05, 51.06, 51.09, 51.1, 530, 532, 535; 307/119

(56) References Cited

U.S. PATENT DOCUMENTS

| | | | | |
|---|---|---|---|---|
| 3,881,160 A | * | 4/1975 | Ross | 200/51.1 |
| 4,622,443 A | * | 11/1986 | Mooz | 200/401 |
| 5,264,821 A | * | 11/1993 | Vultaggio et al. | 200/4 |
| 5,455,886 A | * | 10/1995 | Glenn et al. | 388/827 |
| 5,648,745 A | | 7/1997 | Spriester et al. | 200/51.1 |
| 5,675,300 A | * | 10/1997 | Romerein | 333/100 |
| 5,756,935 A | * | 5/1998 | Balanovsky et al. | 174/52.1 |
| 5,781,844 A | * | 7/1998 | Spriester et al. | 725/127 |
| 5,850,165 A | * | 12/1998 | Spriester et al. | 333/100 |
| 5,909,154 A | * | 6/1999 | Brown et al. | 200/51.1 |
| 5,990,758 A | * | 11/1999 | Matsubara | 333/100 |
| 5,994,976 A | * | 11/1999 | Tang | 174/50 |
| 6,025,760 A | * | 2/2000 | Tang | 333/100 |
| 6,068,511 A | * | 5/2000 | Hsiang | 174/59 |
| 6,099,334 A | * | 8/2000 | Togashi | 200/51.1 |
| 6,129,597 A | * | 10/2000 | Gresko | 439/277 |
| 6,294,846 B1 | * | 9/2001 | Hughes et al. | 200/50.1 |
| 6,302,718 B1 | * | 10/2001 | Kim | 200/51.1 |
| 6,320,144 B1 | * | 11/2001 | Inomata | 200/51.1 |

* cited by examiner

*Primary Examiner*—Brian Sircus
*Assistant Examiner*—Roberto J. Rios
(74) *Attorney, Agent, or Firm*—Hubert J. Barnhardt III; Kenneth M. Massaroni; Shelley L. Couturier

(57) ABSTRACT

A bypass switch (155) for use in an electronic device (125) includes a substrate (205) on which first, second, and third terminals (215, 220, 235) are mounted and an electrically conductive primary element (250), having first and second opposing ends, mounted to a bottom surface of the substrate (205) and electrically coupled to the first terminal (215) at its first end and to the second terminal (220) at its second end. The switch (155) also includes an electrically conductive bypass element (255), having first and second opposing ends, mounted to the bottom surface of the substrate (205) and electrically coupled to the third terminal (235) at its first end and vertically aligned, at its second end, with the second end of the primary element (250). A switch actuator (225) is mechanically coupled to the bypass element (255), extends through the substrate (205), and has an actuating surface (290) accessible at a top surface, opposite the bottom surface, of the substrate (205). A downward force exerted upon the actuating surface (290) of the actuator (225) forces the second end of the bypass element (255) away from the second end of the primary element (250), thereby electrically decoupling the bypass element (255) and the third terminal (235) from the first and second terminals (215, 220).

4 Claims, 5 Drawing Sheets

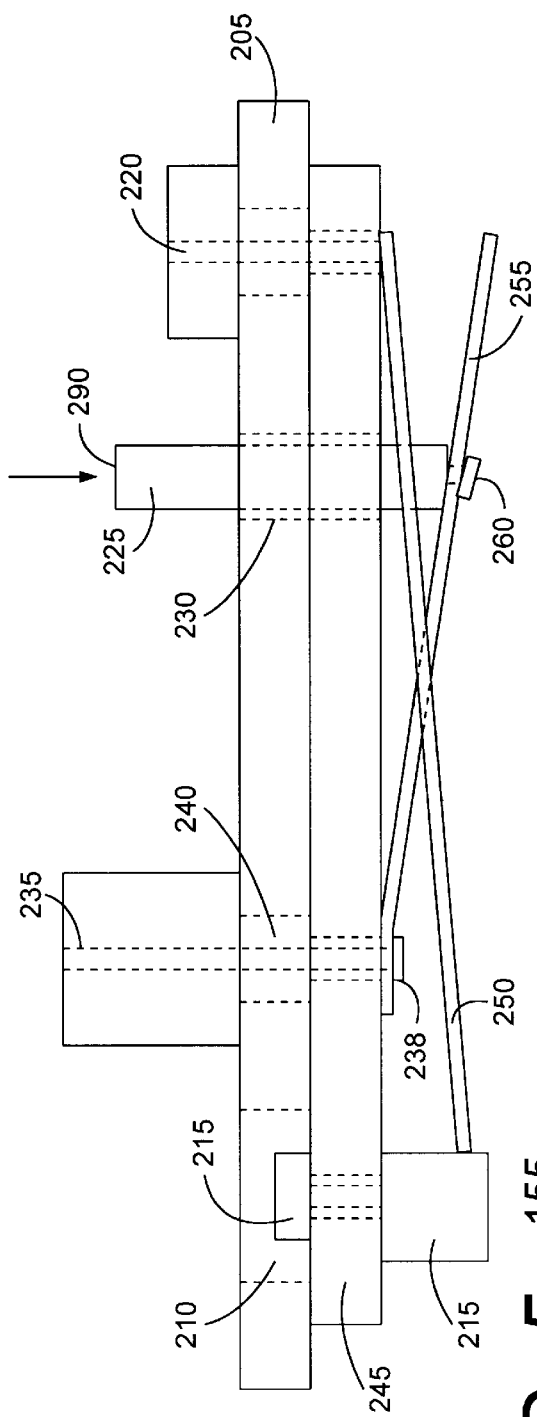

BYPASS DEVICE FOR AMPLIFIER

CROSS REFERENCE TO RELATED APPLICATIONS

The present application is a continuation of and related to U.S. patent application Ser. No. 09/332,778, Hughes et al., entitled Bypass Device for Amplifier, filed Jun. 14, 1999, now U.S. Pat. No. 6,294,846.

FIELD OF THE INVENTION

This invention relates to communication systems and electronic devices for use therein, and more specifically to distribution equipment, such as broadband network amplifiers.

BACKGROUND OF THE INVENTION

When distributing radio frequency (RF) signals, such as video signals, over broadband networks, it is common practice to transmit RF signals over a coaxial cable through an amplifier to a plurality of passive devices. These RF signals originate from a central location commonly referred to as the "headend". Passives tap off the RF signal from a broadband network distribution system, such as a cable television system, and feed the tapped-off RF signal to various subscriber equipment. With the advent of interactive television, these passives must also pass RF signals (which can be referred to as "upstream" or "reverse" signals) from the home to the headend without interfering with RF signals (which can be referred to as "downstream" or "forward" signals) sent to other passives and amplifiers.

Prior art amplifiers amplify and transmit RF signals that carry video and voice data from a central location or headend to a plurality of subscribers. The amplifiers can be upgraded, such as to support higher frequency signals, repaired, or replaced in the field. Doing any of these things, however, requires removal and replacement of the circuitry inside the amplifier housing, which temporarily disconnects service downstream. Such a temporary disconnection in service is often unacceptable to customers and, in two-way systems, to communication service providers as well.

BRIEF DESCRIPTION OF THE DRAWINGS

FIG. 5 is a side view of the bypass device of FIG. 3 when the bypass device is set in an open mode in accordance with the present invention.

FIG. 6 is a side view of the bypass device of FIG. 3 when the bypass device is set in a closed mode in accordance with the present invention.

DETAILED DESCRIPTION OF THE PREFERRED EMBODIMENT

Figure 1:
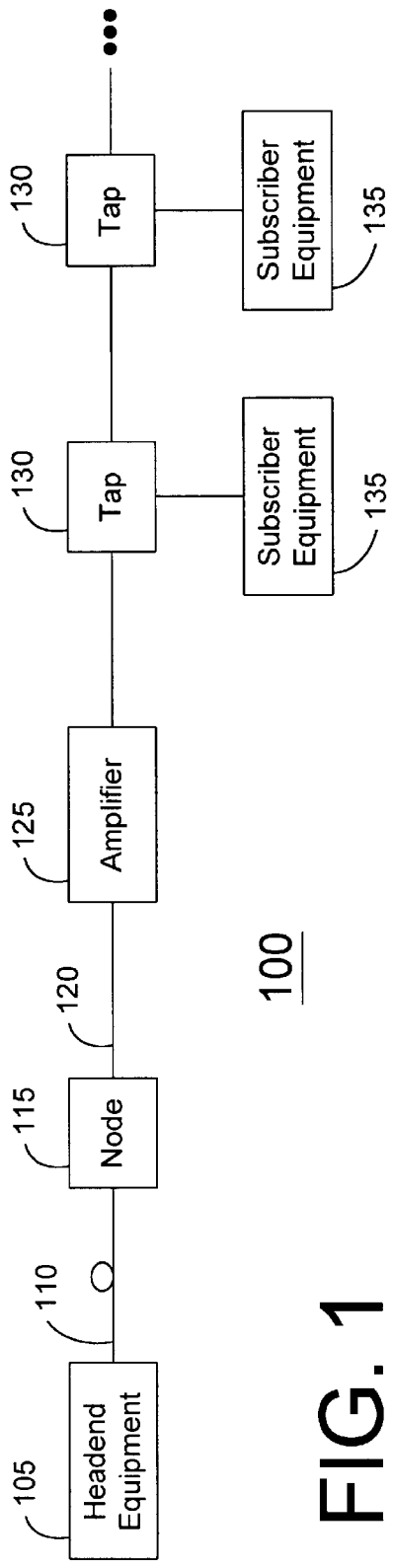
FIG. 1 is a block diagram of a communication system, such as a broadband network, including an amplifier in accordance with the present invention.

Referring to FIG. 1, there is shown a system 100 for distributing data, sound, and video, generally referred to as multimedia information, from a headend unit 105 to subscriber equipment 135. The headend 105 typically receives radio frequency (RF) signals carrying the multimedia information from a satellite, cable, fiber optic networks, microwave, VHF, UHF, or other sources and transmits these signals to a subscriber home or business via a distribution network. The distribution network can include a fiber optic communication channel 110 for coupling the headend equipment 105 to a node 115, which converts optical signals provided by the headend 105 to electrical signals for further distribution over one or more electrical communication channels 120. Amplifiers 125 within the network 100 amplify signals in the downstream direction or, in two-way systems, in both directions. Portions of the amplified signals are split of by taps 130, which route signals to and from subscriber equipment 135, such as computers, telephones, televisions, modems, and set-top decoders/encoders.

Figure 2:
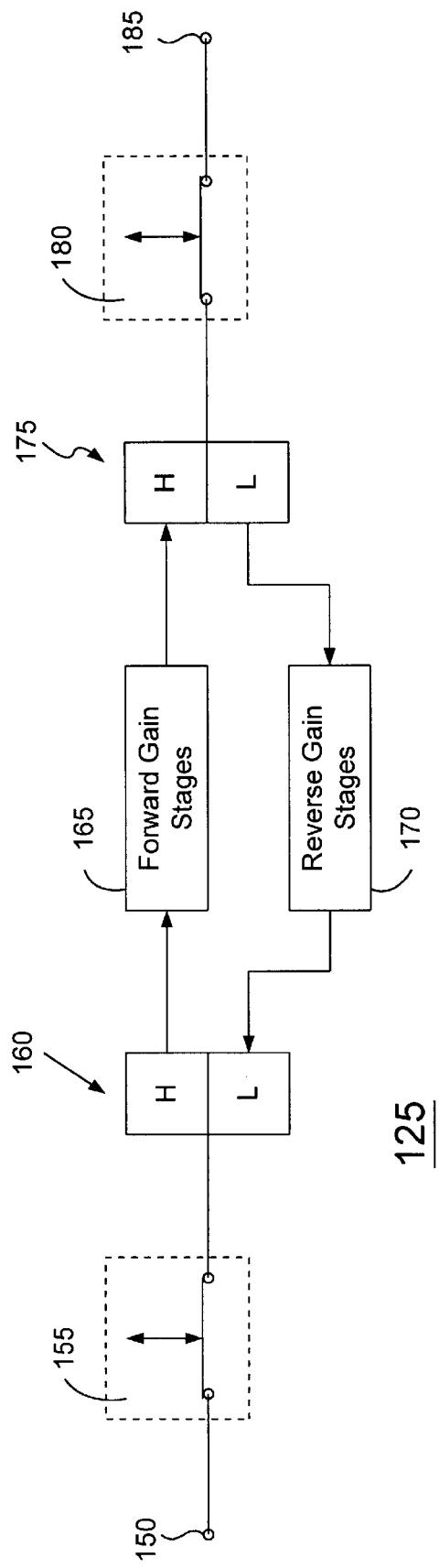
FIG. 2 is a block diagram of an amplifier included in the communication system of FIG. 1 in accordance with the present invention.
Figure 3:
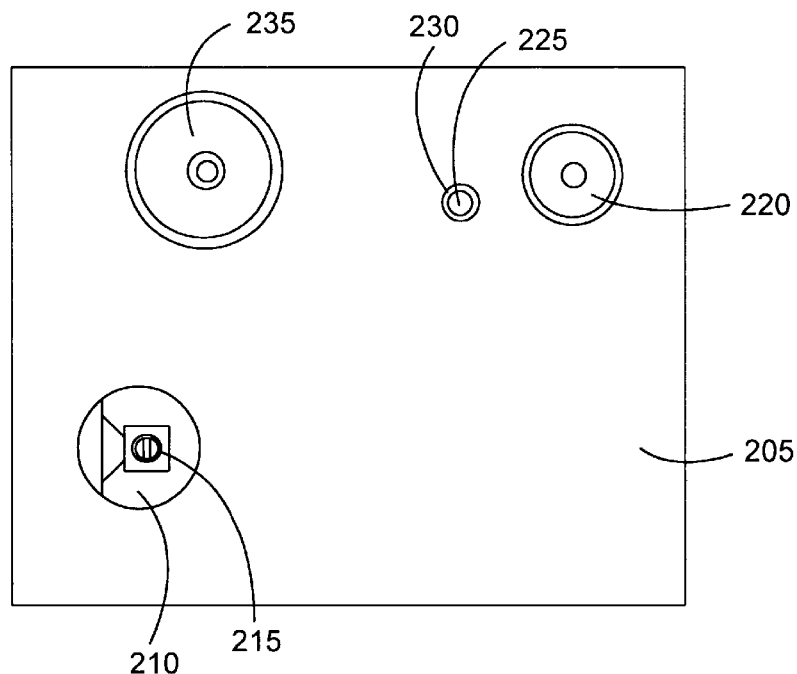
FIG. 3 is a top view of a bypass device included in the amplifier of FIG. 2 in accordance with the present invention.

An example amplifier 125, shown in more detail in FIG. 2, receives a downstream RF signal at input port 150. In a two-way broadband network 100, the downstream RF signal is filtered by the highpass portion of a diplex filter 160, then processed by forward gain stages 165. The amplified downstream signal is routed through a second diplex filter 175 and provided at output port 185. Upstream signals, such as signals generated by subscriber equipment 135, enter the amplifier at output port 185 and are filtered by the lowpass portion of the diplex filter 175. The upstream signals are then amplified by reverse gain stages 170, filtered by diplex filter 160, and provided at port 150.

According to the present invention, the amplifier 125 also includes a bypass device comprising at least two bypass switches 155, 180, one at the amplifier input and one at the amplifier output. More specifically, a first bypass switch is located between input port 150 and the conventional amplifier circuitry, which, in FIG. 2, is shown as including the diplex filter 160 as the first conventional amplifier component encountered in the downstream direction. One of ordinary skill in the art will understand, however, that other types of circuits, such as AC bypass circuits, could precede the diplex filter 160, and that the diplex filter 160 could be omitted entirely in one-way systems. What is important is that the bypass switch 155 be farther upstream in the amplifier 125 than other signal processing circuitry. The second bypass switch 180 is located between the output port 185 and the conventional amplifier circuit, i.e., on the downstream side of other signal processing circuitry. If the amplifier 125 includes additional outputs, additional bypass devices may be provided at each of these ports also.

The first and second bypass switches 155, 180 are, during normal operation of the amplifier 125, in an open, or operational, position in which electrical signals pass into and out of the conventional amplifier circuitry, e.g., diplex filters 160, 175 and gain stages 165, 170, via input and output ports 150, 185. The switches 155, 180 are, according to a preferred embodiment of the present invention, mechanically activated so that insertion of an amplifier module or circuit board, cover, or other amplifier component engages the switches, which are thereby held in the operational position.

Removal of the engaging device, such as an amplifier module, circuit board, cover, or other component, releases a switch member such that the switches 155, 180 operate in a closed, or bypass, position in which conventional amplifier circuitry is bypassed.

FIGS. 3–6 illustrate the mechanical features and operation of each of the bypass switches 155, 180. The bypass switch, as shown in the top view of FIG. 3, includes a substrate 205, comprising a material suitable for mechanically supporting various devices, on which is mounted a primary terminal 215 through which signals enter and/or exit the amplifier 125 via either port 150 or port 185, depending upon the switch location (upstream or downstream) within the amplifier 125. An amplifier terminal 220 couples signals from the primary terminal 215 to and from the amplifier circuitry when the switch is in its operational position, and signals are routed to and from a bypass terminal 235 when the switch is in its bypass position.

According to an example switch that was manufactured and tested, the primary terminal 215 is located on a bottom surface of the substrate 205 and is accessible from the top surface thereof through an opening 210 in the substrate 205, and the amplifier and bypass terminals 220, 235 are formed on the top surface. An actuator 225 for moving the switch between its operational and bypass positions extends through the substrate 205 via aperture 230 so that downwards and upwards forces exerted on the actuator 225 actuate the switch.

Figure 4:
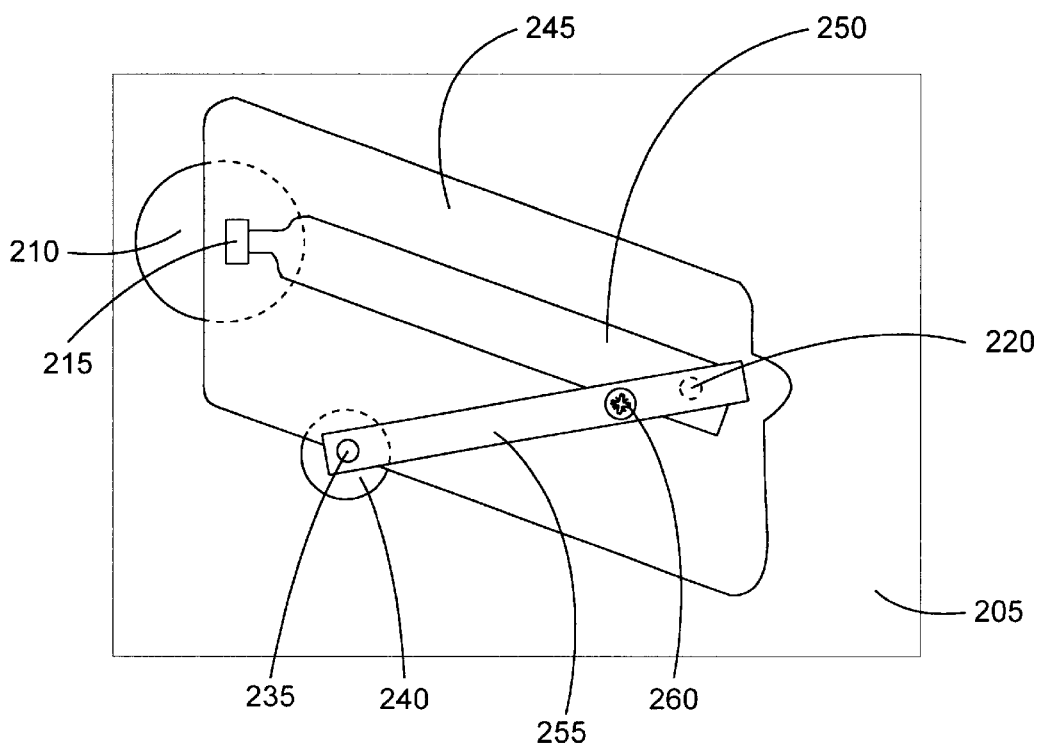
FIG. 4 is a bottom view of the bypass device of FIG. 3 in accordance with the present invention.

As can be seen in FIG. 4, which shows a bottom view of the switch, an electrically nonconductive spacer 245 is coupled to the bottom surface of the substrate 205, which can, for example, be formed from a conductive material. On the spacer 245, an electrically conductive primary element 250 is formed or mounted to electrically couple the primary terminal 215 to the amplifier terminal 220. The primary element 250 is preferably fixed in position. An electrically conductive bypass element 255 is coupled to the bypass terminal 235 and is vertically aligned with the amplifier terminal 220.

Referring next to FIG. 5, a side view of the switch in its operational mode is depicted. As mentioned, the amplifier and bypass terminals 220, 235 are formed on the top substrate surface. The amplifier terminal 220 extends through the substrate 205 and through the spacer 245 to electrically contact and mechanically secure the primary element 250 at a first end. The opposite end of the primary element 250 is electrically coupled to the primary terminal 215 via a fastener 215 formed on the bottom surface of the substrate 205.

The bypass terminal 235 extends through the substrate 205, via aperture 240, and through the spacer 245 to electrically and mechanically couple to the bypass element 255 at a first of its ends. The electrical and mechanical connection between the bypass element 255 and the bypass terminal 235 can be formed, for example, by use of a rivet 238 or other electrically conductive securing mechanism.

The switch actuator 225 is formed from an electrically insulative material, such as plastic, and extends through the substrate 205 and the spacer 245. It can be fastened, such as by a rivet 260, to the bypass element 255, or it can simply be configured to contact and exert force upon the bypass element 255 as necessary. According to the present invention, a force exerted downwards upon an actuating surface 290 of the actuator 225 causes the bypass element 255 to flex away from the primary element 250 in a vertical direction, thereby electrically decoupling the two elements 250, 255 to place the switch in its operational position. In this position, signals travel between the primary terminal 215 and the amplifier terminal 220, with no connections to or from the bypass terminal 235.

As shown in FIG. 6, removal of the downward force on the actuator 225 causes the bypass element 255 to spring upwards towards the substrate 205. This results in electrical and mechanical contact between the bypass element 255 and the primary element 250 at a location approximately beneath the amplifier terminal 220. In this bypass position, the switch electrically couples the primary terminal 215 to the bypass terminal 235.

It will be understood by one of ordinary skill in the art that the bypass element 255 should be flexible enough so that the downward force on the actuator 225 causes the bypass element 255 to flex and decouple from the primary element 250, yet rigid enough to spring back into contact with the primary element 250 upon removal of the force from the actuator 225.

Figure 8:
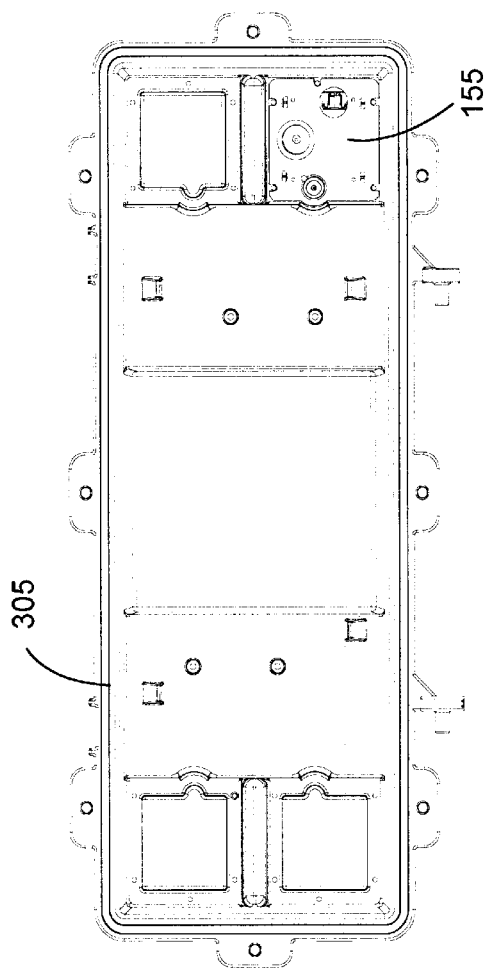
FIG. 8 is a top view of the amplifier housing of FIG. 7 including the bypass device of FIG. 3 in accordance with the present invention.
Figure 7:
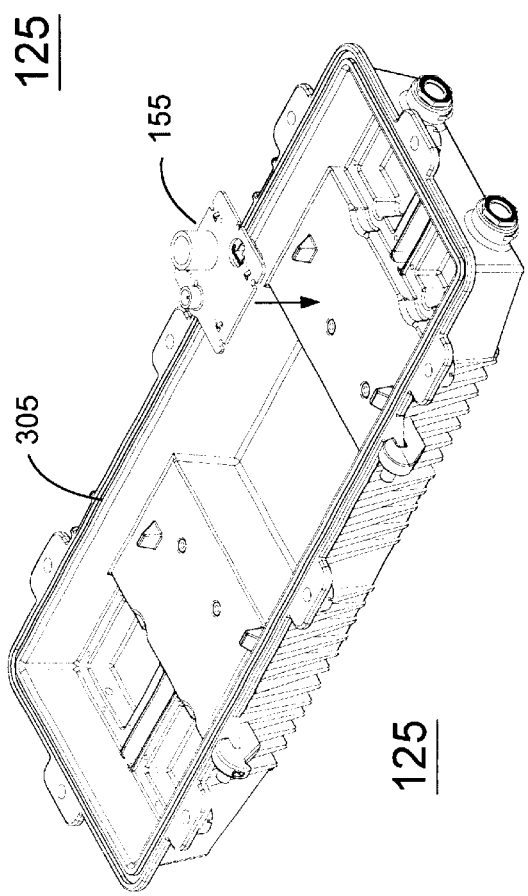
FIG. 7 is an exploded perspective view of the bypass device of FIG. 3 and an amplifier housing in which it can be situated in accordance with the present invention.

As shown in FIGS. 7 and 8, the bypass switch 155 is inserted into a housing 305 of the amplifier 125 and preferably positioned so that the bypass and primary elements 255, 250 are insulated, mechanically and electrically, from contact with other amplifier elements. Although only one bypass switch 155 is depicted for illustrative purposes, it will be appreciated that a first bypass switch 155 should be employed at an upstream location within the amplifier 125, and a second bypass switch 180 should be employed at a downstream location within the amplifier 125, as shown in FIG. 2 and explained in reference thereto.

Figure 10:
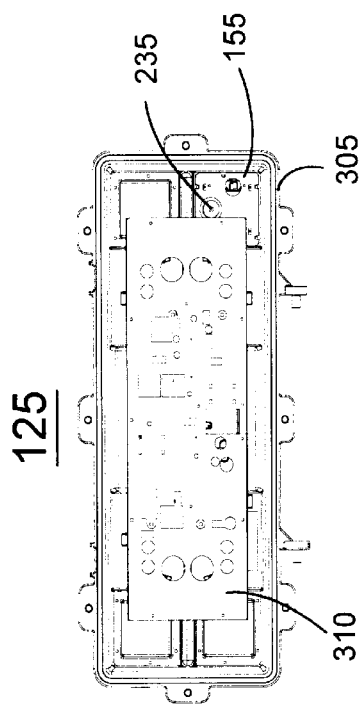
FIGS. 9–11 show the amplifier housing of FIG. 7 including the bypass device of FIG. 3 and an amplifier circuit in accordance with the present invention.
Figure 11:
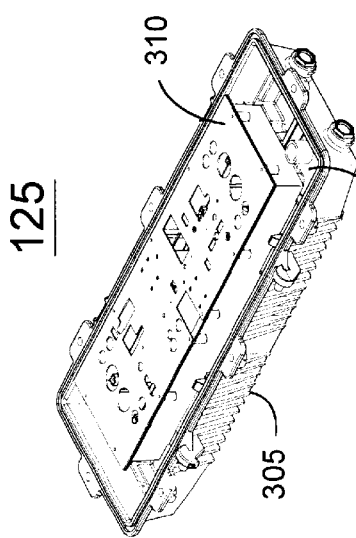
Figure 9:
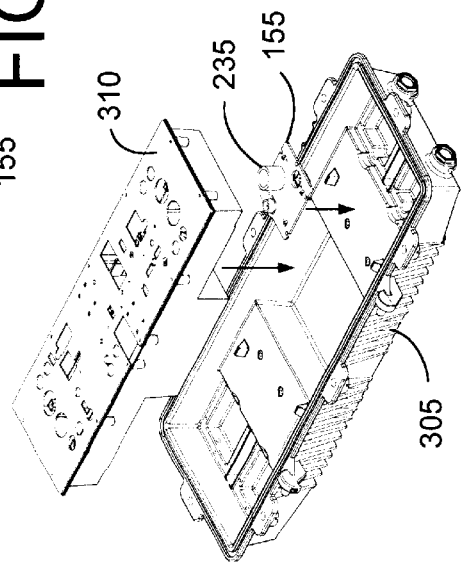

FIGS. 9–11 illustrate the use of the bypass switch 155 in conjunction with other amplifier components. After all bypass switches 155, 180 are inserted into the housing 305, an amplifier module or circuit board 310 housing the remainder of the amplifier circuitry is inserted into the housing 305. According to the present invention, a portion of the amplifier module 310 mechanically contacts the actuation surface 290 (FIG. 5) of the actuator 225 of each bypass switch so that insertion of the module 310 pushes the actuator 225 down, thereby placing each switch in its operational mode. In this mode, the switches electrically couple the amplifier module 310 to the input and output ports 150, 185 (FIG. 2) of the amplifier 125. Preferably, the bypass terminal 235 of each switch is accessible even when the amplifier module 310 is positioned within the housing 305.

When the amplifier circuitry is to be repaired or replaced, replacement circuitry (not shown) can be coupled to the bypass terminal 235 of each bypass switch. Once this is accomplished, the amplifier module 310, which exerts the downward forces on the switch actuators 225, need only be removed from the amplifier housing 305 to instantaneously decouple the amplifier circuitry from the input and output ports 150, 185 and couple the replacement circuit to those same ports 150, 185. As a result, repairs and upgrades to the amplifier 125 can be performed easily and without service interruptions in the broadband network 100.

Although the above bypass device, comprising at least one switch 155, 180, has been described as used by an amplifier within a broadband network, it will be appreciated that such a bypass device could be included within any other communication device for processing electrical signals. For instance, the bypass switches of the above-described bypass device could be included at an input and an output of a headend device, a node, a hub, another type of amplifier, or a tap. Alternatively, such bypass switches could be used to bypass circuit modules or components located within any of the above types of electronic devices.

While the principles of the invention have been made clear in the illustrated embodiments, it will be obvious to those skilled in the art that many modifications can be made to the arrangements, proportions, elements, materials, and components used in the practice of the invention without departing from those principles. The appended claims are therefore intended to cover and embrace any such modifications.

We claim:

1. A bypass switch for use in an electronic device, comprising:

a substrate on which first, second, and third terminals are mounted;

a primary element, having first and second opposing ends, mounted to a bottom surface of the substrate and electrically coupled to the first terminal at its first end and to the second terminal at its second end, wherein the primary element is electrically conductive;

a bypass element, having first and second opposing ends, mounted to the bottom surface of the substrate and electrically coupled to the third terminal at its first end and vertically aligned, at its second end, with the second end of the primary element, wherein the bypass element is electrically conductive; and an actuator mechanically coupled to the bypass element and extending through the substrate, the actuator having an actuating surface accessible at a top surface, opposite the bottom surface, of the substrate, wherein a downward force exerted upon the actuating surface of the actuator forces the second end of the bypass element away from the second end of the primary element, thereby electrically decoupling the bypass element and the third terminal from the first and second terminals.

2. The bypass switch of claim 1, wherein, in the absence of a downward force upon the actuating surface of the actuator, the second end of the bypass element contacts the second end of the primary element, thereby electrically coupling the bypass element and the third terminal to the first and second terminals.

3. The bypass switch of claim 2, wherein the primary element and the bypass element comprise elongated, metal elements.

4. The bypass switch of claim 1, wherein the second and third terminals are formed on the top surface of the substrate.

* * * * *